US011599973B2

(12) United States Patent
Ida

(10) Patent No.: US 11,599,973 B2
(45) Date of Patent: Mar. 7, 2023

(54) IMAGE PROCESSING APPARATUS, LENS APPARATUS, AND IMAGE PROCESSING METHOD FOR SHARPENING PROCESSING

(71) Applicant: CANON KABUSHIKI KAISHA, Tokyo (JP)

(72) Inventor: Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 16/877,733

(22) Filed: May 19, 2020

(65) Prior Publication Data

US 2020/0372615 A1    Nov. 26, 2020

(30) Foreign Application Priority Data

May 24, 2019 (JP) .............................. JP2019-097331

(51) Int. Cl.
*G06T 5/00* (2006.01)
*G06T 5/20* (2006.01)
*G02B 27/00* (2006.01)

(52) U.S. Cl.
CPC .......... *G06T 5/003* (2013.01); *G02B 27/0025* (2013.01); *G06T 5/20* (2013.01)

(58) Field of Classification Search
CPC combination set(s) only.
See application file for complete search history.

(56) References Cited

U.S. PATENT DOCUMENTS

| 7,683,950 | B2 * | 3/2010 | Kelly | H04N 1/58 |
| | | | | 348/252 |
| 8,391,637 | B2 * | 3/2013 | Kinoshita | G06T 5/003 |
| | | | | 382/167 |
| 8,749,659 | B2 | 6/2014 | Watanabe | |
| 9,007,482 | B2 | 4/2015 | Hatakeyama | |
| 9,860,503 | B2 | 1/2018 | Oniki | |
| 9,979,941 | B2 * | 5/2018 | Atif | H04N 9/646 |
| 10,930,691 | B2 | 2/2021 | Yamazaki | |
| 2012/0320224 | A1 | 12/2012 | Miyoshi | |
| 2013/0342749 | A1 * | 12/2013 | Tashiro | G02B 13/009 |
| | | | | 359/689 |

(Continued)

FOREIGN PATENT DOCUMENTS

| CN | 102036012 A | 4/2011 |
| CN | 102957845 A | 3/2013 |

(Continued)

OTHER PUBLICATIONS

Office Action issued in Chinese Appln. No. 202010427728.8 dated Jan. 6, 2022. English translation provided.

*Primary Examiner* — Andrae S Allison
(74) *Attorney, Agent, or Firm* — Rossi, Kimms & McDowell LLP

(57) ABSTRACT

An image processing apparatus includes an information acquisition unit configured to acquire first optical information outside an image circle of an imaging optical system, and a processing unit configured to perform sharpening processing, based on the first optical information, for an input image generated by imaging using the imaging optical system. The first optical information is optical information generated based on second optical information within the image circle of the imaging optical system.

19 Claims, 6 Drawing Sheets

(56) References Cited

U.S. PATENT DOCUMENTS

| | | | | |
|---|---|---|---|---|
| 2014/0320534 | A1* | 10/2014 | Kimura | G06T 11/60 345/634 |
| 2015/0097993 | A1* | 4/2015 | Oniki | G06T 5/004 348/241 |
| 2016/0343111 | A1* | 11/2016 | Oniki | G06T 5/004 |

FOREIGN PATENT DOCUMENTS

| | | |
|---|---|---|
| CN | 105430310 A | 3/2016 |
| CN | 105654456 A | 6/2016 |
| CN | 108028259 A | 5/2018 |
| JP | 5414752 B2 | 2/2014 |
| JP | 2016163316 A | 9/2016 |
| JP | 6124849 B2 | 5/2017 |

\* cited by examiner

COORDINATE

COORDINATE

IMAGE PROCESSING APPARATUS, LENS APPARATUS, AND IMAGE PROCESSING METHOD FOR SHARPENING PROCESSING

BACKGROUND OF THE INVENTION

Field of the Invention

The present invention relates to an image processing apparatus that performs sharpening processing of an image.

Description of the Related Art

In imaging using an optical system, light generated from one point of an object reaches an image plane with a slight spread under the influence of the diffraction, the aberration, and the like generated in the optical system. Thus, the captured image blurs due to the diffraction and aberration of the optical system. It is known that the image blurs can be corrected by image processing using a point spread function (PSF: Point Spread Function), an optical transfer function (OTF: Optical Transfer Function), or the like.

Japanese Patent No. 5414752 discloses a method of sharpening an image by an image restoration filter using the OTF reconstructed from coefficient data according to an imaging condition. Japanese Patent No. 6124849 discloses a method of sharpening an image by unsharp mask processing using a filter generated based on PSF information.

Since the distortion can be corrected by image processing, the imaging optical system can be made compact by designing the imaging optical system to intentionally leave its distortion. However, when the distortion (barrel-type distortion) is large, the image circle of the imaging optical system may not encompass the entire image sensor. Since the light from the object does not reach the imaging plane outside the image circle, there is no optical information such as the PSF and the OTF. Therefore, the methods disclosed in Japanese Patents Nos. 5414752 and 6124849 cannot perform the image sharpening processing based on the optical information when the image circle of the imaging optical system does not encompass the entire image sensor.

SUMMARY OF THE INVENTION

The present invention provides an image processing apparatus, a lens apparatus, and an image processing method, each of which can perform image sharpening processing based on optical information even when an image circle of an imaging optical system does not encompass an entire image sensor.

An image processing apparatus according to one aspect of the present invention includes at least one processor or circuit configured to execute a plurality of tasks including an information acquisition task configured to acquire first optical information outside an image circle of an imaging optical system, and an image processing task configured to perform sharpening processing, based on the first optical information, for an input image generated by imaging using the imaging optical system. The first optical information is optical information generated based on second optical information within the image circle of the imaging optical system.

A lens apparatus according to another aspect of the present invention is attachable to and detachable from an imaging apparatus. The lens apparatus includes an imaging optical system, a memory configured to store the first optical information generated based on second optical information within the image circle of the imaging optical system, and a communicator configured to transmit the first optical information to the imaging apparatus.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

An image processor according to this embodiment performs unsharp mask processing for an input image generated by imaging using an optical system as sharpening processing using a sharpening filter based on an optical characteristic of the optical system. Initially, before the configuration of the imaging apparatus according to this embodiment is described, a description will be given of sharpening processing according to this embodiment. The sharpening processing described herein is properly used for each embodiment described later.

Figure 1A:
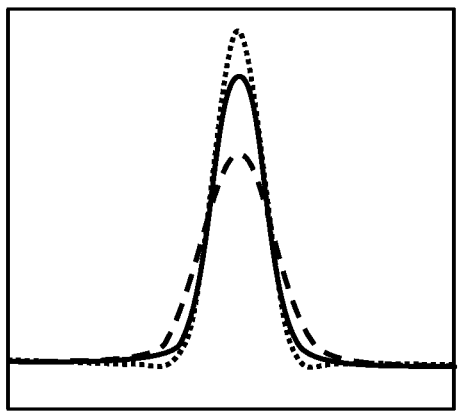
FIGS. 1A and 1B illustrate sharpening using unsharp mask processing according to each embodiment.
Figure 1B:
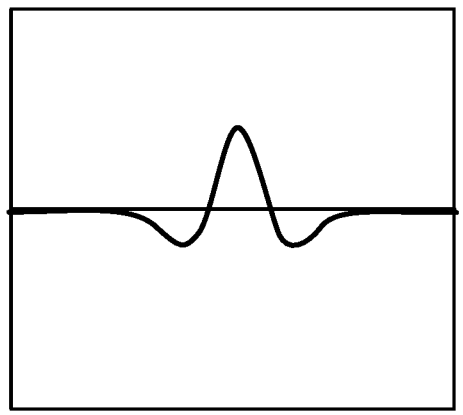

FIGS. 1A and 1B schematically illustrate sharpening using unsharp mask processing. In FIG. 1A, a solid line indicates an input image, a broken line indicates an image obtained by blurring the input image using an unsharp mask, and a dotted line indicates a sharpened image. A solid line in FIG. 1B indicates a correction component. In each of FIGS. 1A and 1B, the abscissa axis represents a coordinate, and the ordinate axis represents a pixel value (luminance value). FIGS. 1A and 1B correspond to a section in a predetermined direction (such as an x direction) in FIGS. 2A and 2B described later.

A sharpened image g(x,y) can be expressed by the following expression (1) where f(x,y) is an input image and u(x,y) is a correction component:

$$g(x, y) = f(x,y) + m \times u(x,y) \quad (1)$$

In the expression (1), m is an adjustment coefficient for changing a correction intensity, and a correction amount can be adjusted by changing a value of the adjustment coefficient m. m may be a constant irrespective of a position in the input image, or the correction amount may be adjusted according to the position in the input image by making m different according to the position in the input image. The adjustment coefficient m(x,y) can be changed according to the imaging condition such as the focal length, the F-number (aperture value), and the object distance of the optical system.

Where USM(x,y) is an unsharp mask, the correction component u(x,y) can be expressed by the following expression (2). USM(x,y) is, for example, a tap value at the coordinate (x,y).

$$u(x,y)=f(x,y)-f(x,y)*USM(x,y) \quad (2)$$

The following expression (3) can be expressed by transforming the right side of the expression (2):

$$u(x,y)=f(x,y)*(\delta(x,y)-USM(x,y)) \quad (3)$$

Herein, "*" denotes a convolution (convolution integral, sum of products), and "$\delta(x,y)$" denotes a delta function. The delta function is data in which the number of taps is equal to USM(x,y), the center value is 1, and other values are filled with 0.

Since the expression (3) can be expressed by modifying the expression (2), the expressions (2) and (3) are equivalent with each other. A description will now be given of the way of generating the correction component using the expression (2).

The expression (2) calculates a difference between the input image f(x,y) and an image obtained by blurring the input image f(x,y) with an unsharp mask, and generates the correction component u(x,y) based on the difference information. In the general unsharp mask processing, a smoothing filter, such as a Gaussian filter, a median filter, and a moving average filter, is used for the unsharp mask.

For example, when the Gaussian filter is used as the unsharp mask for the input image f(x,y) indicated by the solid line in FIG. 1A, an image obtained by blurring the input image f(x,y) is indicated by the broken line in FIG. 1A. The correction component u(x,y) is a component indicated by the solid line in FIG. 1B obtained by subtracting the broken line in FIG. 1A from the solid line in FIG. 1A. By using the correction component calculated in this way and by calculating the expression (1), the input image f(x,y) illustrated by the solid line in FIG. 1A can be sharpened as illustrated by the dotted line in FIG. 1A.

Next follows sharpening an image that has been deteriorated by the influence of the diffraction, the aberration, or the like generated by the optical system by applying the unsharp mask processing. The input image f(x,y) generated by imaging using the optical system can be expressed by the following expression (4), where I(x,y) is an image (original image) having no deterioration caused by the optical system, and psf(x,y) is a PSF of the optical system:

$$f(x,y)=I(x,y)*psf(x,y) \quad (4)$$

A description will now be given of the input image f(x,y) obtained by rotationally symmetrically blurring the original image I(x,y). When the optical system is a rotationally symmetric coaxial optical system, the PSF corresponding to the center of the image is rotationally symmetric. Therefore, by applying the rotationally symmetric USM to the center of the image, the input image f(x,y) can be sharpened and made closer to the original image I(x,y). Since the correction amount is a difference value between the input image and the image obtained by blurring the input image with the unsharp mask, the unsharp mask may have a shape closer to the psf(x,y) rather than a simple smoothing filter for an accurate correction.

For example, assume that the input image is degraded due to the spherical aberration. While the spherical aberration affects the rotational symmetry, the smoothing filter such as the Gaussian filter has a distribution shape different from that of the PSF due to the influence of the spherical aberration. Thus, in order to reduce the blur effect in a rotationally symmetrical manner, a more accurate correction can be made by using the PSF of the optical system.

Therefore, this embodiment uses the PSF for the unsharp mask USM(x,y). While the input image f(x,y) illustrated in FIG. 1A has a symmetrical shape for simplicity, the image does not have to possess a symmetrical shape. Even if the original image I(x,y) has an asymmetric shape, if the deterioration function (corresponding to psf(x,y)) convolved with the original image I(x,y) is rotationally symmetric, a rotationally symmetric unsharp mask can be used for sharpening.

Figure 2A:
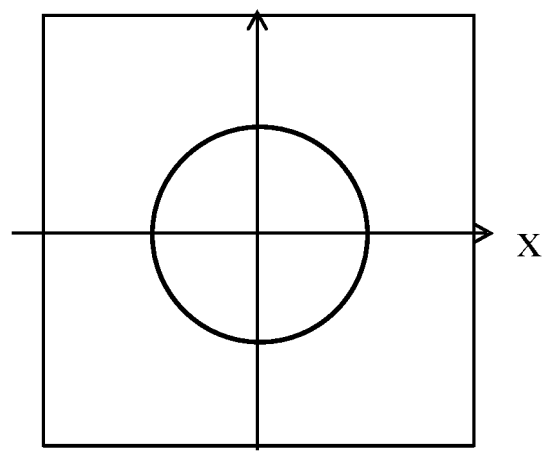
FIGS. 2A and 2B schematically illustrate a PSF of an optical system according to each embodiment.
Figure 2B:
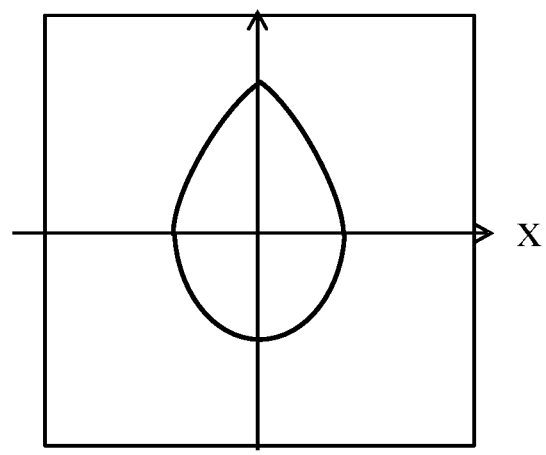

Next follows a description of the input image f(x,y) made by rotationally asymmetrically blurring the original image I(x,y). Even when the imaging optical system is a rotationally symmetric coaxial optical system, the PSF at an off-center position of the image usually has an asymmetric shape. FIGS. 2A and 2B schematically illustrate the PSF of the imaging optical system on the xy plane, FIG. 2A illustrates an on-axis PSF, and FIG. 2B illustrates an off-axis PSF.

For example, when the original image is an ideal point image, the input image f(x,y) becomes the PSF of the optical system from the expression (4). If there is an ideal point image at the angle of view corresponding to FIG. 2B and the original image is degraded by the influence of the PSF of the imaging optical system, the input image becomes a blurred image as illustrated in FIG. 2B. A description will be given of sharpening an asymmetrically blurred image using the unsharp mask processing.

Figure 3A:
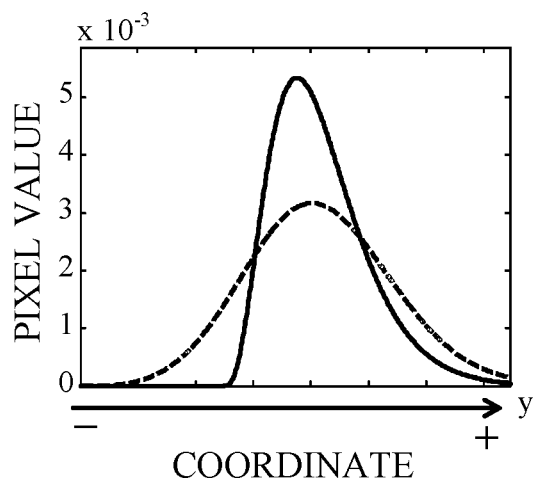
FIGS. 3A to 3C explain sharpening processing using a rotationally symmetrical unsharp mask according to each embodiment.
Figure 3B:
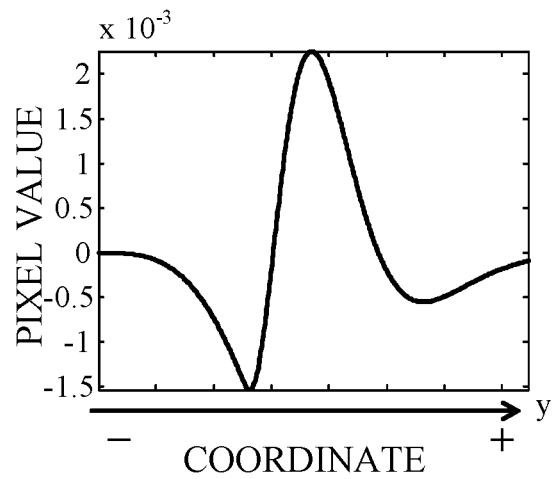
Figure 3C:
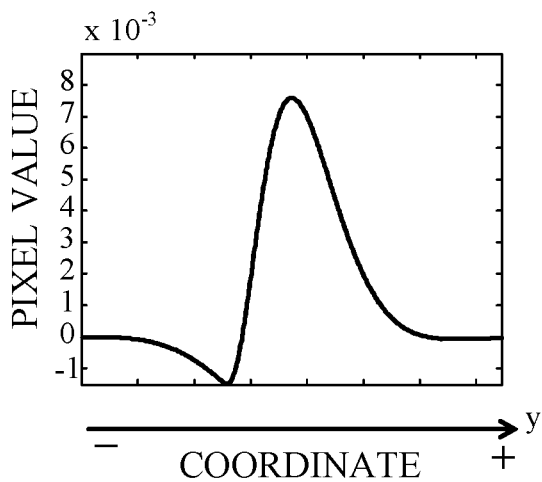
Figure 4A:
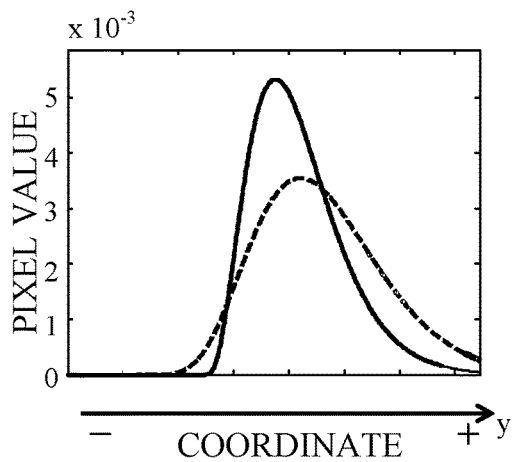
FIGS. 4A to 4C explain sharpening processing using a rotationally asymmetric unsharp mask according to each embodiment.
Figure 4B:
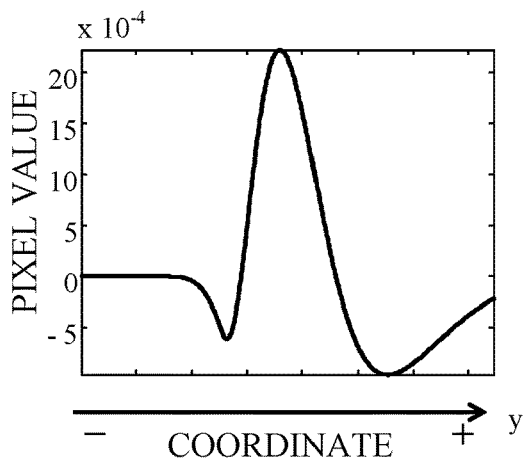
Figure 4C:
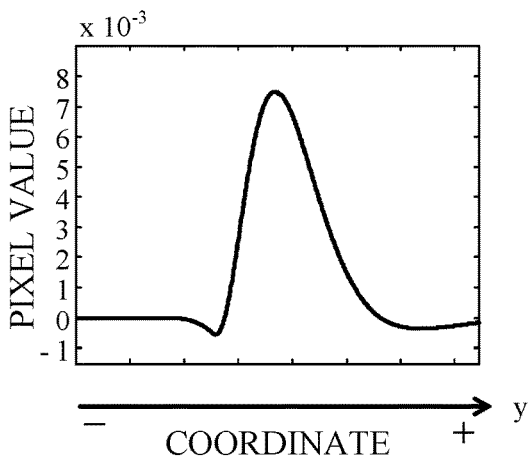

FIGS. 3A to 3C and 4A to 4C schematically illustrate the unsharp processing to an asymmetrically deteriorated image, FIGS. 3A to 3C illustrate use of the rotationally symmetric unsharp mask, and FIGS. 4A to 4C illustrate use of the rotationally asymmetric unsharp mask, for processing. In FIGS. 3A to 3C and 4A to 4C, the ordinate and abscissa axes are similarly defined as in FIG. 1.

In FIGS. 3A and 4A, the solid line represents a section in the y-axis direction in FIG. 2B, and the dotted line represents the input image blurred with the unsharp mask. The Gaussian filter is applied to the rotationally symmetric unsharp mask in FIGS. 3A to 3C, and the PSF of the optical system is applied to the rotationally asymmetric unsharp mask in FIGS. 4A to 4C.

Each of FIGS. 3B and 4B plots a difference value between the input image and the input image blurred with a corresponding one of unsharp masks, and illustrates the correction component. In FIGS. 3A and 4A, a side in which the input image spreads is defined as a positive side of the Y-axis.

In FIG. 3A, the difference value between the input image and the original image is small on the plus side of the peak position of the solid line, and the difference value between the input image and the original image is large on the minus side. Therefore, the extreme value of the correction component of FIG. 3B on the minus side becomes smaller than that on the plus side of the center peak position.

As understood by comparing the curves in FIGS. 3A and 3B with each other, the correction amount on the plus side is smaller and the correction amount on the minus side is larger. Hence, the asymmetrical blur cannot be corrected even with sharpening using the expression (4). FIG. 3C illustrates the post-sharpening result when m=1. Although the sharpening is made for the solid line in FIG. 3A, the value on the minus side is much smaller than that on the plus side, and it is understood that the asymmetric blur has not been corrected.

Herein, assume that the correction amount is adjusted by changing the adjustment coefficient m in the expression (1) without changing the unsharp mask. When the value of the adjustment coefficient m is increased so as to sufficiently correct the plus side of the image, the minus side of the image becomes overcorrected (undershoot), and when the value of the adjustment coefficient m is adjusted so as to make proper the correction amount on the minus side of the image, the plus side of the image is undercorrected.

Thus, the unsharp mask processing using the rotationally symmetrical unsharp mask has difficulties in sharpening the asymmetrically blurred or degraded image. This problem similarly occurs even when a rotationally symmetrical filter other than the Gaussian filter is used as the rotationally symmetrical unsharp mask.

On the other hand, in FIG. 4A, the difference value between the input image and the original image is large on the plus side of the peak position of the solid line, and the difference value between the input image and the original image is small on the minus side. In other words, this tendency is opposite to that in FIG. 3A. Therefore, the extreme value of the correction component in FIG. 4B is also smaller on the plus side than that on the minus side of the center peak position.

By applying the correction component illustrated in FIG. 4B to the input image represented by the solid line in FIG. 4A, the correction amount is made larger on the plus side (having a larger blur amount) of the peak position, and the correction amount is smaller on the minus side (having a smaller blur amount).

In such an asymmetric unsharp mask, the blurring distribution of the input image and the correction amount distribution of the correction component are balanced, so that the overcorrection or the undercorrection is less likely to occur that becomes a problem in applying a rotationally symmetric unsharp mask. FIG. 4C illustrates the result after sharpening with m=1. The solid line in FIG. 4A is sharpened, and the depression on the minus side, which occurs in FIG. 3C, is improved. Moreover, in comparison with the rotationally symmetric unsharp mask, the overcorrection is less likely, so that the value of the adjustment coefficient m in the expression (4) can be maintained relatively large and sharpening that reduces the asymmetry can be performed.

In addition, in order to further improve the correction accuracy, it is necessary that part significantly blurred by the PSF of the imaging optical system is greatly blurred by the unsharp mask. Therefore, when the input image f(x,y) is rotationally asymmetrically blurred relative to the original image I(x,y), the PSF of the optical system may be used for the unsharp mask. In this case, the sharpening filter (a coefficient matrix to be convoluted with an input image in the sharpening processing) is a two-dimensional filter whose components are rotationally asymmetrically distributed. The sharpening filter includes a coefficient matrix to be convoluted with the input image in the sharpening processing, and the component of the sharpening filter includes matrix components (tap values).

The PSF of the optical system differs for each imaging condition including the focal length of the optical system, the F-number of the optical system, and the object distance. The PSF also differs depending on the position in the input image. Therefore, the sharpening filter may be changed for each position in the input image and for each imaging condition.

From the expressions (1) and (3), the image g(x,y) after the sharpening processing can be expressed by the following expression (5):

$$g(x,y)=f(x,y)+m \times f(x,y)*\{\delta(x,y)-\text{USM}(x,y)\} \quad (5)$$

The following expression (6) summarizes the right side of the expression (5) with respect to the input image f(x,y).

$$g(x,y)=f(x,y)8\{\delta(x,y)+m \times (\delta(x,y)-\text{USM}(x,y))\} \quad (6)$$

In the expression (6), the term in the brace on the right side corresponds to the sharpening filter.

[IMAGE RESTORATION PROCESSING]

Next follows a description of an outline of the image restoration processing which is different sharpening processing. The following expression (7) is established where g(x,y) is a captured image (degraded image), f(x,y) is an original image, and h(x,y) is a PSF which is a Fourier pair of the OTF:

$$g(x,y)=h(x,y)*f(x,y) \quad (7)$$

Herein, * denotes a convolution (convolution integral, sum of products), and (x,y) is a coordinate on the captured image.

When the expression (7) is Fourier-transformed and converted into a display form on the frequency plane, the expression (8) represented by a product for each frequency is obtained.

$$g(u,v)=H(u,v) \cdot F(u,v) \quad (8)$$

Herein, H denotes OTF obtained by Fourier-transforming the PSF(h), and G and F are obtained by Fourier-transforming the deteriorated image g and the original image f, respectively. (u,v) is a coordinate on a two-dimensional frequency plane or a frequency.

In order to obtain the original image f from the captured deteriorated image g, both sides may be divided by the optical transfer function H as in the following expression (9).

$$G(u,v)/H(u,v)=F(u,v) \quad (9)$$

Then, F(u,v) or G(u,v)/H (u,v) is inversely Fourier-transformed and returned to the real surface, so that the original image f(x,y) is obtained as a restored image.

Where R is the inverse Fourier transform of $H^{-1}$, the original image f(x,y) can be similarly obtained by the convolution processing to the image on the real surface as in the following expression (10).

$$g(x,y)*R(x,y)=f(x,y) \quad (10)$$

Herein, R(x,y) is called an image restoration filter. When the image is a two-dimensional image, generally, the image restoration filter R is also a two-dimensional filter having a tap (cell) corresponding to each pixel of the image. Moreover, in general, the larger the number of taps (the number of cells) of the image restoration filter R is, the higher the restoration accuracy becomes. Therefore, the feasible number of taps is set according to the required image quality, image processing capability, aberration characteristics, and the like. Since the image restoration filter R needs to reflect at least the aberration characteristics, it is different from the conventional edge enhancement filter having about three taps each in the horizontal and vertical directions. Since the image restoration filter R is set based on the OTF, both the deterioration of the amplitude component and the deterioration of the phase component can be corrected with high accuracy.

Since an actual image contains a noise component, the image restoration filter R created by calculating the reciprocal of the OTF and used as described above may significantly amplify the noise component together with the restoration of the deteriorated image. This is because the MTF (amplitude component) of the optical system is raised so as to return the MTF (amplitude component) to 1 over all frequencies where the noise amplitude is added to the amplitude component of the image. The MTF, which is the amplitude degradation due to the optical system, returns to 1, but at the same time, the noise power spectrum also increases, and as a result, the noise is amplified according to the degree (restoration gain) to which the MTF is increased.

Therefore, when the noise is included, a good image cannot be obtained as an image to be observed. This is expressed by the following expressions (11-1) and (11-2).

$$G(u,v)=H(u,v)\cdot F(u,v)+N(u,v) \quad (11\text{-}1)$$

$$G(u,v)/H(u,v)=F(u,v)+N(u,v)/H(u,v) \quad (11\text{-}2)$$

Herein, N is the noise component. For an image containing a noise component, there is a method of controlling the restoration degree according to the intensity ratio SNR between the image signal and the noise signal, such as a Wiener filter represented by the following expression (12).

$$M(u, y) = \frac{1}{H(u, v)} \frac{|H(u, v)|^2}{|H(u, v)|^2 + SNR^2} \quad (12)$$

Herein, M(u,v) is the frequency characteristic of the Wiener filter, and |H(u,v)| is the absolute value (MTF) of the OTF. This method reduces the restoration gain (restoration degree) for each frequency when the MTF is smaller, and increases the larger the restoration gain when the MTF is larger. In general, the MTF of the imaging optical system is high on the low frequency side and low on the high frequency side, so that this method substantially reduces the restoration gain on the high frequency side of the image.

Thus, the image restoration filter can be obtained by inversely Fourier-transforming a function designed based on the inverse function of the OTF of the imaging optical system. The image restoration filter applicable to the sharpening filter according to this embodiment is properly variable and, for example, the above Wiener filter can be used. The Wiener filter when used can create an image restoration filter in a real space that actually convolves an image by inversely Fourier-transforming the expression (12). The OTF changes according to the image height (image position) of the imaging optical system even in one imaging state. Thus, the image restoration filter is used after it is modified according to the image height.

Next follows the sharpening processing when the image circle does not encompass the entire image sensor. The image circle is a range in which light from the object plane forms an image on the imaging plane through the imaging optical system, and is a circle in an optical system rotationally symmetric with respect to the optical axis. The size of the image circle can be represented by a radius. For example, a range in which the peripheral light amount ratio is equal to or more than a predetermined value or a range in which the imaging performance is equal to or more than a predetermined value may be defined as the image circle. Usually, the imaging optical system is designed so that the radius of the image circle covers the entire surface of the image sensor. In other words, for a rectangular image sensor, the imaging optical system is designed so that the image circle radius is larger than the diagonal length of the image sensor.

As described above, since the distortion can be corrected by the image processing in the digital camera, the image circle of the imaging optical system can be designed so as not to encompass the entire image sensor. Unless the distortion is corrected, the captured image has an area outside the image circle and thus there is an area that is not imaged at low luminance. Accordingly, an image may be output in which the distortion is corrected so as to include only the area within the image circle on the captured image.

On the other hand, since blurs of the captured image change due to the distortion correction processing, the sharpening processing using the optical information may be performed prior to the distortion aberration correction. Now, assume that the captured image has an area outside the image circle in the sharpening processing. Then, since no light is formed outside the image circle, the PSF and the OTF are not defined. On the other hand, when the data amount of the optical information and the calculation load of the sharpening filter are considered, the optical information and the sharpening filter based on the optical information can be obtained at discrete image positions on the imaging plane.

Figure 5:
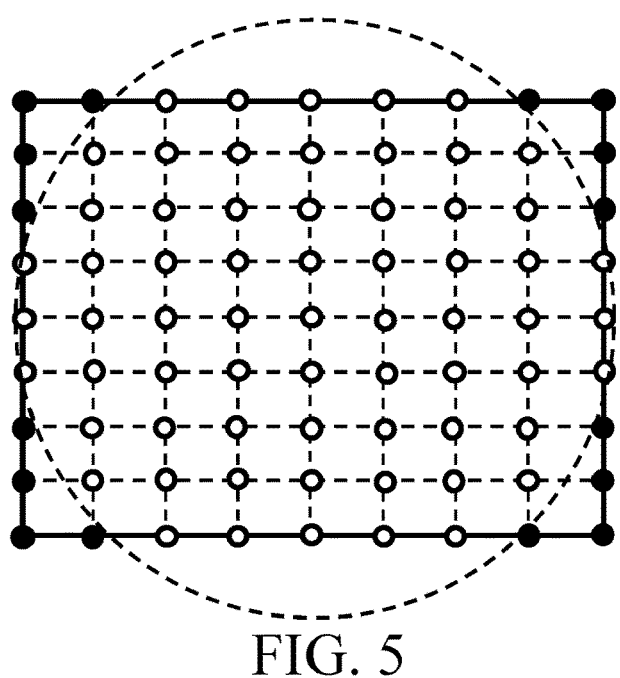
FIG. 5 explain a relationship between an image position for generating the sharpening filter according to each embodiment and an image circle.

FIG. 5 explains a relationship between an image (or screen) position for generating a sharpening filter and an image circle. In FIG. 5, the image position at which the sharpening filter is obtained for the captured image (imaging area) is indicated by a dot, and the image circle is drawn by a broken line. The optical information is available at an image position of a white dot, because the white dot is located inside the image circle, but the optical information is unavailable at an image position of a black dot, because the black dot is located outside the image circle. If the optical information is not defined, a data storing method must be changed from that of an image processing apparatus that presumes that there is optical information and the sharpening processing cannot be executed. If the sharpening processing is not performed outside the image circle, it is necessary to acquire the image circle radius for each imaging condition such as the zoom, the F-number, and the focus position.

At this time, since the processing is switched at the end of the image circle, unless the image circle radius is accurately obtained and the sharpening processing can be performed on the entire imaged area, the sharpened image becomes unnatural. However, it is difficult to accurately obtain an image circle radius that changes due to the imaging condition and the manufacturing error. In addition, it is necessary to interpolate and acquire at least one of the optical information, the sharpening filter, and the sharpened image at the image position where there is no white or black dot. If no optical information is defined at the image position of the black dot, the sharpening processing cannot be executed at the image position that requires interpolation with the image position of the black dot even within the image circle. Similarly, where interpolation is performed while discrete data is saved for the imaging condition, no interpolation is available with the imaging condition in which the image position for performing the sharpening processing is located outside the image circle. Since the image position and the image position where the interpolation for the imaging condition is required are located within the image circle, it is necessary to consider the sharpening effect after the interpolation.

Figure 6:
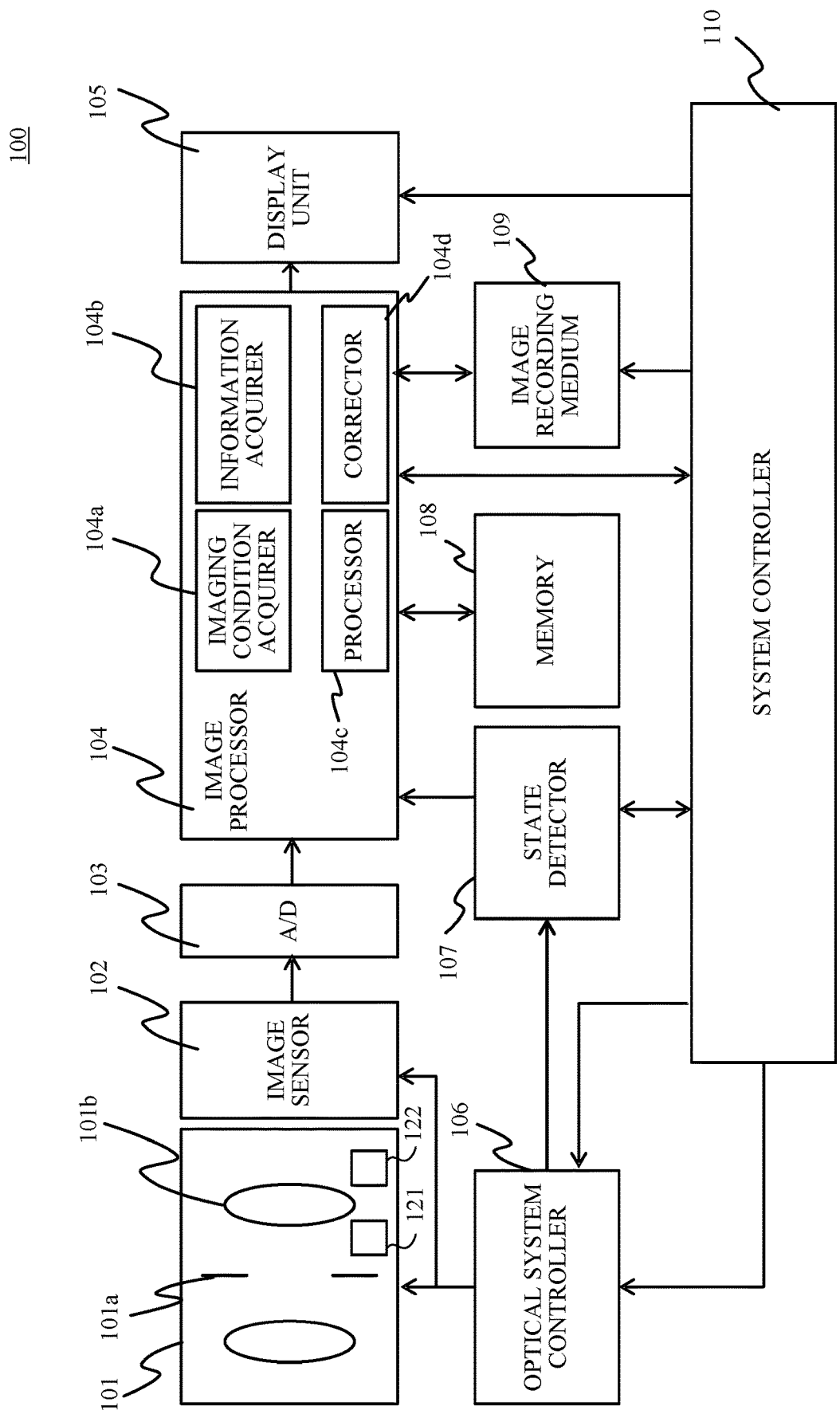
FIG. 6 is a block diagram of an imaging apparatus according to each embodiment.

Next follows a description of a configuration of the imaging apparatus (image pickup apparatus) according to this embodiment. Referring now to FIG. 6, a description will be given of an imaging apparatus 100 according to this embodiment. FIG. 6 is a block diagram illustrating a configuration of the imaging apparatus 100. An image processing program for performing the sharpening processing according to this embodiment is installed in the imaging apparatus 100. The sharpening processing according to this embodiment is executed by an image processor (image processing apparatus) 104 in the imaging apparatus 100.

The imaging apparatus 100 includes an optical system (imaging optical system) 101 and an imaging apparatus body (camera body). The optical system 101 has an aperture stop (or diaphragm) 101a and a focus lens 101b, and is integrated with the camera body. The present invention is not limited to this embodiment, and is also applicable to an imaging apparatus in which the optical system 101 is detachable from and attached to the camera body. The optical system 101 may include an optical element having a diffractive surface, an optical element having a reflective surface, and the like, in addition to an optical element having a refractive surface such as a lens.

An image sensor 102 includes a CCD sensor or a CMOS sensor, and generates a captured image (image data) by photoelectrically converting an object image (an optical image formed by the optical system 101) formed via the optical system 101. In other words, the object image is converted into an analog signal (electric signal) by the photoelectric conversion by the image sensor 102. An A/D converter 103 converts the analog signal input from the image sensor 102 into a digital signal, and outputs the digital signal to the image processor 104.

The image processor 104 performs predetermined processing for the digital signal and performs the sharpening processing according to this embodiment. The image processor 104 includes an imaging condition acquirer (information condition acquisition unit) 104a, an information acquirer (information acquisition unit) 104b, a processor (processing unit) 104c, and a corrector (correction unit) 104d. The imaging condition acquirer 104a acquires an imaging condition of the imaging apparatus 100 from a state detector 107. The imaging condition include an F-number (aperture value), an imaging distance (focus position), a focal length of a zoom lens, and the like. The state detector 107 may obtain the imaging condition directly from the system controller 110 or may obtain the imaging condition from the optical system controller 106.

A memory 108 stores the PSF or data necessary to generate the PSF. The memory 108 includes, for example, a ROM. The output image processed by the image processor 104 is stored in an image recording medium 109 in a predetermined format. A display unit 105 includes a liquid crystal monitor or an organic EL display and displays an image obtained by performing the predetermined display processing for the image that has undergone the sharpening processing. However, the image displayed on the display unit 105 is not limited to this embodiment, and an image that has undergone simple processing for high-speed display may be displayed on the display unit 105.

A system controller 110 controls the imaging apparatus 100. Mechanical driving of the optical system 101 is performed by the optical system controller 106 based on an instruction from the system controller 110. The optical system controller 106 controls the aperture diameter in the aperture stop 101a so as to have the predetermined F-number. The optical system controller 106 controls the position of the focus lens 101b by an unillustrated autofocus (AF) mechanism or a manual focus mechanism in order to perform focusing according to the object distance. Functions such as aperture diameter control of the diaphragm 101a and manual focus do not have to be executed according to the specifications of the imaging apparatus 100.

An optical element such as a low-pass filter and an infrared cutting filter may be disposed between the optical system 101 and the image sensor 102, but it is necessary to consider an element that affects the optical characteristic such as a low-pass filter when it is used, in creating the sharpening filter. The infrared cutting filter also affects the RSF of each of the RGB channel, in particular, the PSF of the R channel, which is an integral value of the PSF of the spectral wavelength, and thus needs to be considered in creating the sharpening filter. Thus, the sharpening filter may be changed according to whether there is the low-pass filter or the infrared cutting filter.

The image processor 104 includes an ASIC, and each of the optical system controller 106, the state detector 107, and the system controller 110 includes a CPU or an MPU. In addition, one or more of the image processor 104, the optical system controller 106, the state detector 107, and the system controller 110 may be shared by the same CPU or MPU.

A specific description will now be given of the sharpening processing performed by the image processor 104 according to each embodiment.

First Embodiment

Figure 7:
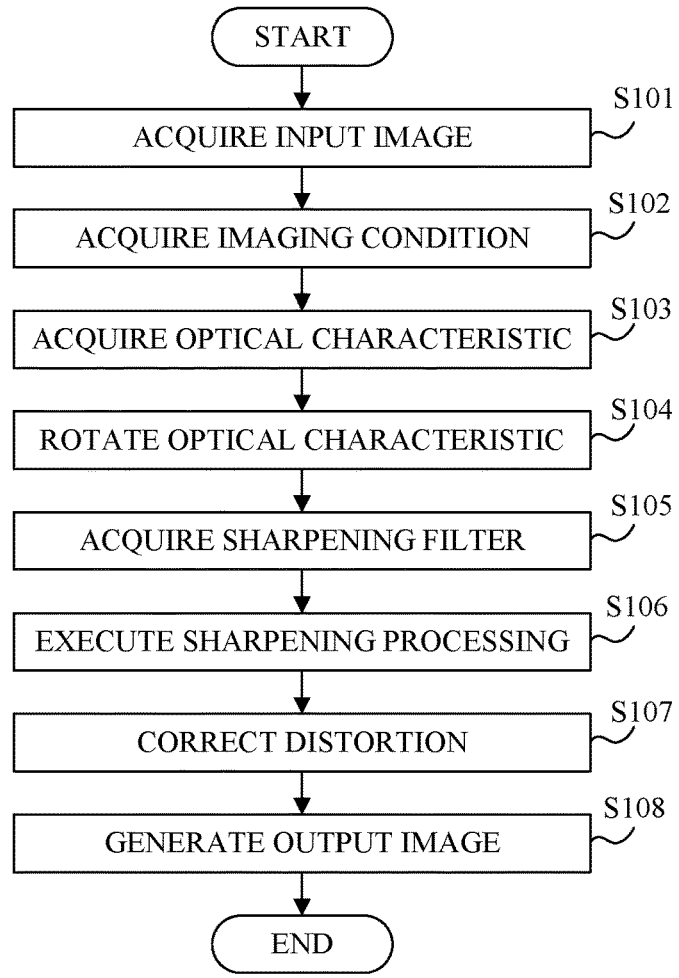
FIG. 7 is a flowchart of image processing according to a first embodiment.

A description will now be given of the sharpening processing according to a first embodiment. FIG. 7 is a flowchart of the sharpening processing according to this embodiment. The sharpening processing according to this embodiment is mainly executed by each component in the image processor 104 based on the instruction from the system controller 110. The flowchart in FIG. 7 can be implemented as a program for causing a computer to execute the function of each step. This is similarly applied to the following flowchart. In this embodiment, the image circle of the optical system (imaging optical system) 101 does not encompass part of the image sensor 102. Hence, the input image has an area outside the image circle. In this invention, a position where the peripheral light amount ratio is 5% or less is regarded as being located outside the image circle. However, the ratio of the peripheral light amount outside the image circle is properly variable depending on the designs of the imaging optical system and the imaging apparatus.

Figures 8A, 8B:
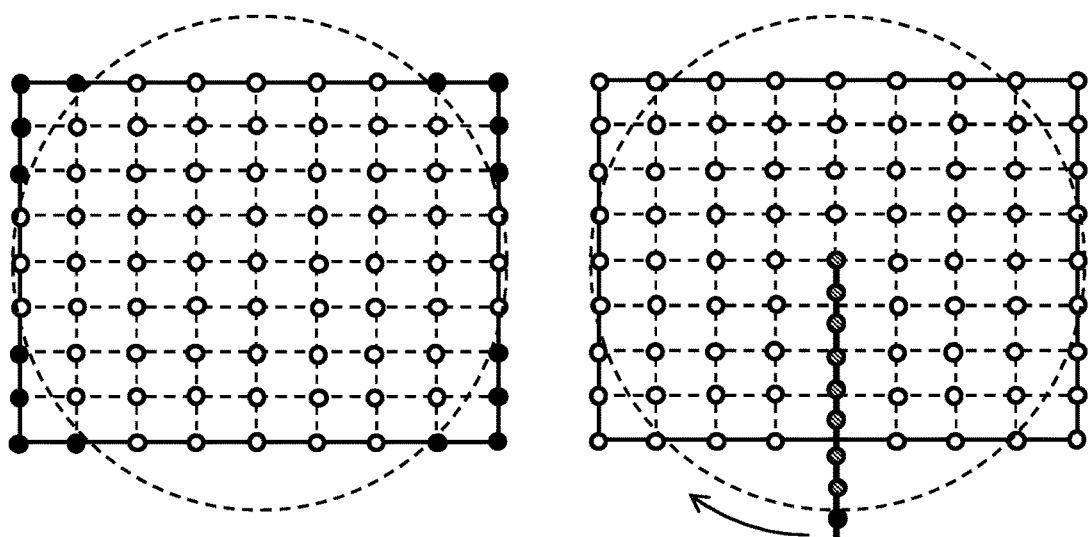
FIGS. 8A and 8B explain the way of generating the sharpening filter according to each embodiment.

Before the flowchart in this embodiment is described, referring now to FIGS. 8A and 8B, a description will be given of the way of generating (acquiring) the sharpening filter according to this embodiment. FIGS. 8A and 8B explain the way of generating the sharpening filter. FIG. 8A illustrates the position on the input image where the sharpening filter is generated. White and black dots in FIG. 8A indicate positions on the input image where the sharpening filter is generated. This embodiment generates the sharpening filter based on the optical characteristic of the optical system 101 at 81 positions discretely arranged on the input image. By performing the linear interpolation or the like for the generated sharpening filter, the sharpening filter can be generated at an arbitrary position on the input image. The proper sharpening filter is applicable to an arbitrary position to the input image while the processing load is reduced for generating the sharpening filter.

FIG. 8A sets 9×9=81 positions at which the sharpening filter is generated, but the positions may be further reduced in order to further reduce the processing load, or the position may be changed in order to further increase the correction accuracy. The optical characteristic can be directly acquired for each point of the white dot in FIG. 8A to generate the sharpening filter but the optical characteristic and the sharpening filter may also be generated by the interpolation. FIG. 8B illustrates an example in which the optical characteristic at each position is generated by the interpolation.

Initially, the optical characteristics are obtained at the positions of the black and gray dots in FIG. 8B. The broken line is the image circle of the imaging optical system, the gray dot is located at the position where the second optical information is obtained, and the black dot is located at the position where the first optical information is obtained. In general, the PSF of the optical system is rotationally symmetric with respect to the optical axis, and the optical characteristic is also rotationally symmetric with respect to the optical axis. Utilizing this characteristic, in FIG. 8B, the optical characteristics at a plurality of positions (10 locations indicated by black and gray dots) having different image heights from the center of the input image are acquired. While they are rotated around the center of the input image, the optical characteristic at the position corresponding to each white dot is generated by the interpolation. Then, the sharpening filter is obtained at each position based on the optical characteristic at each position. Thereby, the optical characteristic does not have to be acquired at each position, so that the processing load and data amount can be reduced. Herein, the optical characteristics for 81 points are obtained by interpolation from the optical characteristics for 10 points, but the sharpening filter for 81 points may be obtained by obtaining the optical characteristics for 10 points and then by interpolating the sharpening filter.

Initially, in the step S101 in FIG. 7, the image processor 104 acquires as an input image an image captured by the image sensor 102 in the imaging apparatus 100. The input image is stored in the memory 108. The image processor 104 may obtain as an input image an image stored in the image recording medium 109.

Next, in the step S102, the imaging condition acquirer 104a acquires the imaging condition in capturing the input image. The imaging condition includes the focal length, the F-number of the optical system 101, the imaging distance, and the like. In case of the imaging apparatus in which the optical system 101 is interchangeably mounted on the camera body, the imaging condition further includes a lens ID and a camera ID. The imaging condition acquirer 104a may acquire the imaging condition directly from the imaging apparatus 100, or may acquire the imaging condition from information (such as EXIF information) attached to the input image.

Next, in the step S103, the information acquirer 104b acquires the optical characteristic (optical information) of the optical system 101 from the memory 108. In this embodiment, the optical characteristic includes the PSFs at the positions of the black and gray dots in FIG. 8B. Alternatively, the optical characteristic such as the OTF corresponding to the PSF, or coefficient data of a function that approximately represents the PSF or the OTF. The optical characteristic (optical information) includes optical information (first optical information, pseudo optical information) outside the image circle generated in a pseudo manner, in addition to the optical information (second optical information) in the image circle.

Herein, "pseudo" is not optical information at the image position determined based on the optical characteristic of the optical system (imaging optical system) 101 or the imaging apparatus 100, but formal information to be used for the subsequent processing. Indeed, since optical information is not defined outside the image circle, any attempts to define the optical information will provide pseudo optical information. By including the pseudo optical information, the subsequent processing can be executed with the same processing flow as that when the image circle encompasses the entire area of the image sensor 102.

This embodiment may generate the pseudo optical information by duplicating the optical characteristic with the highest image height in the second optical information indicated by the gray dots in FIG. 8B. There is no effect of the sharpening processing outside the image circle because the object is not imaged. On the other hand, since the second optical information is stored only at discrete image heights, there is an image height side inside the image circle and higher than the position of the maximum image height in the second optical information. In this case, the sharpening processing based on the interpolation between the pseudo optical information (first optical information) and second optical information can be applied to the position where the object is imaged. Since the pseudo optical information is made as a duplicate of the optical characteristic with the maximum image height in the second optical information, the sharpening processing can be executed in which adverse effects such as the undershoot due to the interpolation of the optical characteristics are reduced.

Herein, for example, since the sharpening processing is not required outside the image circle, if the pseudo optical information set to aberration-free information, the optical characteristic at the image position where the optical characteristic is interpolated is significantly different from the actual optical characteristic. As a result, the adverse effect such as the undershoot occurs, or the sharpening effect becomes insufficient. In addition to the fact that the sharpening processing is unnecessary, the noises are amplified outside the image circle when the filter having the sharpening effect is applied based on the second optical information. However, use of the pseudo optical information based on the second optical information for the outside the image circle improves the sharpening effect while the adverse effects are suppressed in a region where the interpolation between the first optical information and the second optical information is required.

Herein, the pseudo optical information is generated by the duplication from the second optical information. However, for example, the pseudo optical information may be generated by the extrapolation from a plurality of high optical image heights in the second optical information. It may be generated by performing a process of lowering the imaging performance such as a blur process on the optical characteristic having the highest image height. In general, since the imaging performance often decreases on the high image height side, by using optical characteristics having lower imaging performance than the second optical information as the first optical information, the actual optical performance at the interpolation position can be improved. In some cases, pseudo optical information that approximates characteristics can be obtained.

While this embodiment generates the first optical information based on the second optical information that has been stored in advance, but the second optical information used to generate the first optical information is not limited to one that is stored in the imaging apparatus 100 or the lens apparatus (optical system 101). In other words, the optical characteristic (second optical information) within the image circle is obtained at more image positions than those stored in the storage unit such as the memory 108, and the first optical information may be generated from part of the positions as described above. Thereby, the first optical information can be generated based on the second optical information at a position closer to the boundary of the image circle.

Next, in the step S104, the processor 104c generates the optical characteristic at the position corresponding to each white dot in FIG. 8A by the interpolation while the optical characteristic acquired in the step S103 is rotated with respect to the center of the input image. Next, in the step S105, the processor 104c acquires a sharpening filter from the optical characteristic of the position corresponding to each white dot acquired in the step S104 and the expression (6). Since the optical characteristic (PSF) is different at each position in the input image, each sharpening filter applied to each position in the input image is different.

Next, in the step S106, the processor 104c executes the sharpening processing for the input image based on the sharpening filter acquired in the step S105. In other words, the processor 104c sharpens the input image by convolving the sharpening filter with the input image. Next, in the step S107, the corrector 104d corrects the distortion in the input image that has undergone the sharpening processing in the step S106. Next, in the step S108, the image processor 104 generates as an output image the input image that has undergone the distortion correction, and stores it in the image recording medium 109. Thereby, the entire image processing according to this embodiment is completed.

In this embodiment, the information acquirer 104b acquires the optical characteristic from the memory 108 in the imaging apparatus 100, but the present invention is not limited to this embodiment. For example, in the imaging apparatus in which the optical system 101 is detachable from and attached to the camera body, the information acquirer 104b transmits the optical characteristic stored in the memory in the lens apparatus including the optical system 101 to the imaging apparatus through communications. In this case, as illustrated in FIG. 6, the lens apparatus (optical system 101) includes a memory 121 that stores the first optical information generated based on the second optical information in the image circle of the optical system 101, and a communicator 122 for transmitting the first optical information to the camera body.

The first optical information may be generated based on the design value or individual measurement information during manufacturing, and stored in the imaging apparatus or the lens apparatus in advance. Thereby, the first optical information may not be generated during imaging, and the calculation load can be reduced. When the image circle encompasses the entire area of the image sensor 102, the first optical information may be stored in the same format as that of the second optical information. Thereby, the processor 104c can execute the processing regardless of whether or not the image circle of the optical system 101 encompasses the entire area of the image sensor 102 in the imaging condition of the input image. The imaging apparatus in which the optical system 101 is detachably attached to the camera body can execute the processing without depending on a difference caused by an image circle of the attached optical system 101. Therefore, there is no need to change the configuration of the processor 104c in order to support the optical system in which the image circle does not encompass the entire area of the image sensor 102.

The optical information may be stored in a server in advance as well as the memory in the imaging apparatus or the lens apparatus. In this case, the optical information can be downloaded to the imaging apparatus or the lens apparatus through communications if necessary. Even in this case, it is unnecessary to generate the optical information in the imaging apparatus by acquiring the optical information generated in advance, and therefore the calculation load can be reduced.

The first optical information may be generated according to whether or not the position is outside the image circle. The optical information is generated based on the optical characteristic obtained by the simulation or measurement during designing or manufacturing. For example, in the simulation, the optical characteristic may be output even when a light amount reaching the image plane is extremely small or not imaged. In the measurement, when the light amount reaching the image plane is small, the optical characteristic cannot be obtained with high accuracy. Therefore, it may be determined whether or not the position is outside the image circle based on a predetermined rule that defines the image circle, and the second optical information may be generated by the simulation or measurement only when the position is determined to be within the image circle. The first optical information may be generated at the imaging position determined to be outside the image circle, based on the second optical information after the second optical information is generated.

The first optical information may be generated in a predetermined direction, the rotation processing may be performed according to the position in the input image associated with the first optical information, and the sharpening processing may be performed based on the first optical information after the rotation processing. The first optical information may be generated from the second optical information having the same direction. The direction means that the predetermined rotation direction or the meridional direction may be the predetermined direction. The same direction means that the meridional direction is the same direction. This embodiment generates the first optical information at the position indicated by the black dot from the second optical information at the position indicated by the gray dot in FIG. 8B, and thereby generates the first optical information based on the second optical information having the same direction. By generating and storing the second optical information and the first optical information before the rotation processing according to the position in the input image, the first optical information can be easily generated from the second optical information. For example, in an attempt to generate the first optical information corresponding to the position of the black dot in FIG. 8A from the second optical information generated at the position of the white dot in FIG. 8A, it is difficult to generate the first optical information by the duplication or extrapolation because the directions are different. On the other hand, the first optical information can be uniquely generated by generating the first optical information from the second optical information having the same direction utilizing the rotational symmetry of the optical system 101.

The image position and image height for generating or storing the first optical information may be within the image circle under a different imaging condition of the optical system 101. In order to store a predetermined data amount of optical information with high accuracy, an amount of information on unnecessary image positions may be small. On the other hand, storing the optical information at a different image position and a different image height for each imaging condition needs to separately store information on the image position and image height, causing a larger data amount and more complicated processing. On the other hand, when the first optical information is generated or stored at an image position or image height that is within the image circle under a certain imaging condition but outside the image circle under a different imaging condition, the data amount can be reduced without complicating the processing. In other words, the position in the input image associated with the first optical information is located within the image circle when at least one of the zoom position, the F-number, and the focus position of the imaging optical system is different (or within the image circle depending on the lens state).

A partial area of the input image, which has undergone the sharpening processing based on the first optical information and the second optical information, may be included in the output image in which the corrector 104d has corrected the distortion. In this embodiment, an area that has sharpened using both the second optical information and the first optical information is an area near the boundary of the image circle. Including this area in the output image can capture an image at an angle of view utilizing the effective area of the image circle.

Since the sharpening processing based on the first optical information uses the pseudo optical information, the adverse effect such as the undershoot is likely to occur. In addition, since the object image is not formed outside the image circle, the noises are amplified according to the gain of the sharpening processing even though the sharpening is unnecessary. Accordingly, the sharpening processing based on the first optical information may reduce the gain. In other words, the processor 104c performs the first sharpening processing based on the first optical information and the second sharpening processing based only on the second optical information, and the first gain in the first sharpening processing is smaller than the second gain in the second sharpening processing.

For example, the gain can be reduced by increasing the weighted addition rate (the ratio of the input image to the output image) in the sharpening processing. When the weighted addition rate is set to 80%, an image obtained by weighting and averaging 80% of the input image and 20% of the corrected image becomes the output image. This is equivalent to adding 20% of the difference between the post-correction image and the pre-correction image to the pre-correction image, and may be calculated as such. In other words, the value of the adjustment coefficient m in the expression (6) may be adjusted. Thus, the sharpening degree (gain) of the sharpening processing can be reduced by determining the weighted addition rate and performing the sharpening processing. This embodiment has described an example in which the gain is controlled by the weighted addition rate (or the adjustment coefficient m), but the present invention is not limited to this embodiment, and any other methods for controlling the gain may be used.

The information acquirer 104b may acquire information on the image circle such as an image circle radius. By obtaining the image circle radius, the gain can be controlled as described above according to the boundary position of the image circle on the image. Moreover, the information acquirer 104b may acquire identification information for identifying the first optical information and the second optical information. The gain can be controlled as described above by obtaining the identification information of the first optical information and the second optical information together with the optical information.

This embodiment acquires the optical characteristic in the step S103, rotates the optical characteristic in the step S104, and acquires the sharpening filter in the step S105, but the present invention is not limited to this embodiment as long as the step S106 performs the sharpening processing based on the optical characteristic. For example, the steps S104 and S105 may be exchanged with each other, the sharpening filter may be rotated after the sharpening filter is obtained from optical characteristic, and the sharpening filter at the position of the white dot may be calculated. Alternatively, for example, intermediate data for acquiring the sharpening filter may be acquired from optical characteristic, and the sharpening filter may be acquired from the intermediate data in the step S105 after the intermediate data is rotated. In this embodiment, the first optical information is rotationally asymmetrical, but the present invention is not limited to this embodiment.

This embodiment assumes that the image circle of the optical system 101 does not encompass part of the image sensor 102 but it is conceivable that the image circle of the optical system 101 encompasses the entire area of the image sensor 102 depending on the imaging condition. In this case, it may be determined whether or not the image circle of the optical system 101 encompasses the entire area of the image sensor 102 based on the imaging condition acquired in the step S102. If it is determined that the image circle of the optical system 101 encompasses the entire area of the image sensor 102, the sharpening processing using only the second optical information can be made, so that only the second optical information may be acquired in the step S103.

Second Embodiment

Figure 9:
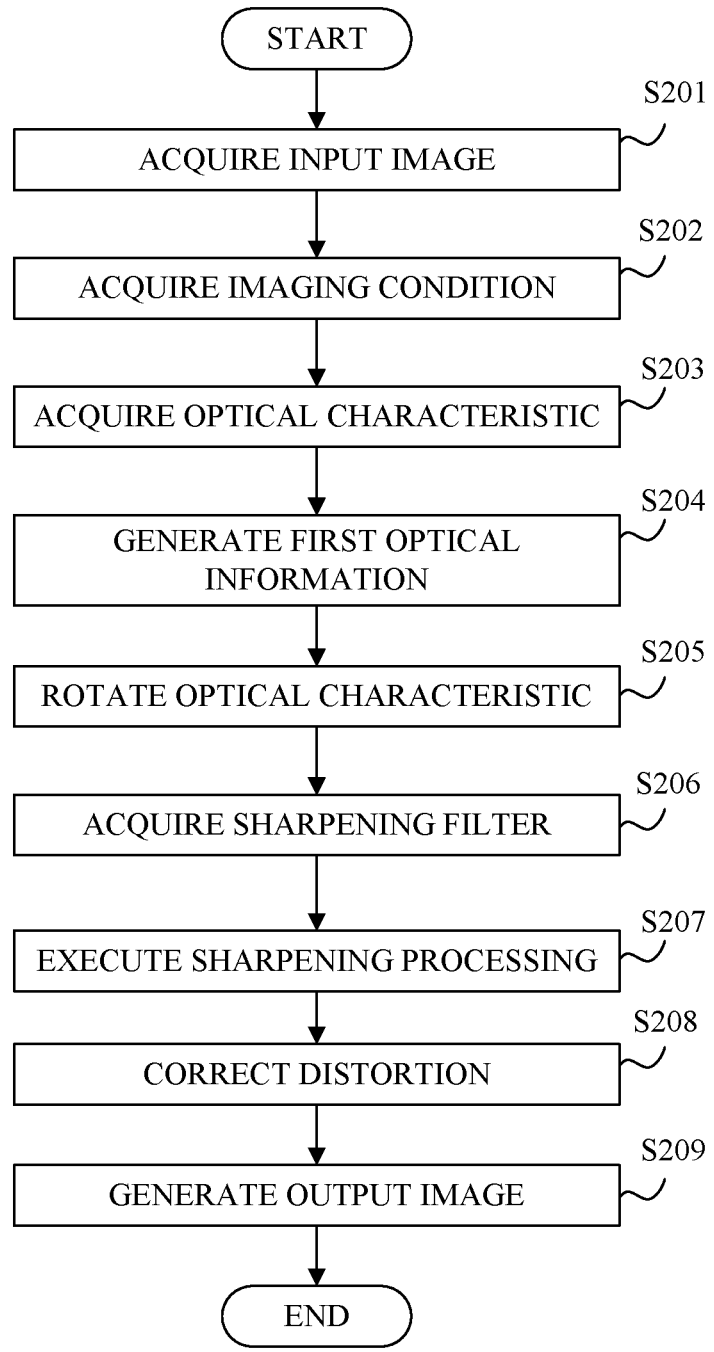
FIG. 9 is a flowchart of image processing according to a second embodiment.

Next follows a description of the sharpening processing according to a second embodiment. FIG. 9 is a flowchart of the sharpening processing according to this embodiment. The sharpening processing according to this embodiment is mainly executed by each component in the image processor 104 based on the instruction from the system controller 110. In this embodiment, the image circle of the optical system (imaging optical system) 101 does not encompass part of the image sensor 102. Thus, the input image has an area outside the image circle. This embodiment is different from the first embodiment in that this embodiment generates the first optical information through the image processor (image processing apparatus) 104 whereas the first embodiment acquires the first optical information previously stored in the storage such as the memory 108. The steps S201, S202, and S205 to S209 in FIG. 9 are the same as the steps S101, S102, and S104 to S108 in FIG. 7, respectively, and thus a description thereof will be omitted.

In the step S203, the information acquirer 104b acquires the optical characteristic (optical information) of the optical system 101 from the memory 108. In this embodiment, unlike the first embodiment, the optical characteristic (optical information) includes only the optical information (second optical information) in the image circle, and does not include the optical information (first optical information) outside the image circle generated in a pseudo manner. Since the image circle of the optical system 101 according to this embodiment does not encompass the entire area of the image sensor 102, the optical information is not obtained for at least one of the image positions for acquiring the optical information in the optical system in which the image circle encompasses the entire area of the image sensor 102.

Next, in the step S204, the processor 104c generates the first optical information based on the second optical information acquired in the step S203. More specifically, the processor 104 determines that the image position at which the optical information has not been acquired is outside the image circle, and generates the first optical information by duplicating the second optical information at the closest position. In and subsequent to the step S205, the image processor 104 generates an output image and completes the image processing similar to the first embodiment. This embodiment can reduce the data amount of the optical information by generating the first optical information in the imaging apparatus without previously storing the first optical information.

Each of the embodiments has described the unsharp mask processing using the PSF as the sharpening processing but the present invention is not limited to these embodiments. The sharpening processing may be other processing such as unsharp mask processing without using the PSF or edge enhancement processing as long as the processing uses the sharpening filter based on the optical characteristic of the optical system 101. The sharpening processing may be image restoration processing represented by the Wiener filter or iterative image restoration processing represented by the RL method.

The input image may be output from the imaging apparatus to an image processing apparatus provided separately from the imaging apparatus, and the image processing apparatus may perform the image processing. In this case, information necessary for the correction including the optical information may be appended to the input image in addition to the imaging condition information. The imaging condition information and the correction information can be transferred directly or indirectly from the imaging apparatus to the image processing apparatus through communications, other than being appended to the input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

The above embodiment can provide an image processing apparatus, a lens apparatus, and an image processing method capable of sharpening an image based on optical information even when an image circle of an imaging optical system does not include the entire image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097331, filed on May 24, 2019, which is hereby incorporated by reference herein in its entirety.

What is claimed is:

1. An image processing apparatus comprising:
at least one processor or circuit configured to execute a plurality of tasks including:
an information acquisition task configured to acquire first optical information outside an image circle of an imaging optical system; and
an image processing task configured to perform sharpening processing, based on the first optical information, for an input image generated by imaging using the imaging optical system,
wherein the first optical information is generated based on second optical information within the image circle.

2. The image processing apparatus according to claim 1, wherein the first optical information is optical information previously stored in a memory.

3. The image processing apparatus according to claim 1, wherein the information acquisition task acquires the first optical information generated by setting a predetermined direction to a meridional direction, and
wherein the image processing task performs rotation processing for the first optical information according to a position in the input image associated with the first optical information, and performs the sharpening processing based on the first optical information after the rotation processing.

4. The image processing apparatus according to claim 1, wherein the first optical information is generated based on the second optical information which is generated by setting a predetermined direction to a meridional direction, by setting the predetermined direction to the meridional direction.

5. The image processing apparatus according to claim 1, wherein a position in the input image associated with the first optical information is located within the image circle when at least one of a zoom position, an F-number, and a focus position of the imaging optical system is different.

6. The image processing apparatus according to claim 1, wherein the plurality of tasks further includes a correction task configured to correct a distortion in the input image after the sharpening processing.

7. The image processing apparatus according to claim 6, wherein the image processing task performs the sharpening processing in at least a partial area of the input image based on the first optical information and the second optical information.

8. The image processing apparatus according to claim 7, wherein an area that is the partial area of the output image and has undergone the sharpening processing based on the first optical information and the second optical information is included in an output image in which the correction task has corrected the distortion.

9. The image processing apparatus according to claim 1, wherein the first optical information is the same as optical information at a maximum image height in the second optical information.

10. The image processing apparatus according to claim 1, wherein the first optical information is generated by extrapolating the second optical information.

11. The image processing apparatus according to claim 1, wherein the first optical information and the second optical information are information on deterioration of the input image caused by the imaging optical system.

12. The image processing apparatus according to claim 1, wherein the first optical information is an optical transfer function or a point spread function of the imaging optical system.

13. The image processing apparatus according to claim 1, wherein a first gain in the sharpening processing is smaller than a second gain in sharpening processing based only on the second optical information.

14. The image processing apparatus according to claim 1, wherein the information acquisition task acquires information on the image circle.

15. The image processing apparatus according to claim 1, wherein the information acquisition task acquires identification information used to identify the first optical information and the second optical information.

16. An imaging apparatus comprising:
an image sensor; and
the image processing apparatus according to claim 1.

17. A lens apparatus attachable to and detachable from an imaging apparatus, the lens apparatus comprising:
an imaging optical system;
a memory configured to store first optical information outside an image circle of the imaging optical system; and
a communicator configured to transmit the first optical information to the imaging apparatus,
wherein the first optical information is used for sharpening processing for an input image generated by imaging using the imaging optical system, and is generated based on second optical information within the image circle.

18. An image processing method comprising:
acquiring first optical information outside an image circle of an imaging optical system; and
performing sharpening processing, based on the first optical information, for an input image generated by imaging using the imaging optical system,
wherein the first optical information is generated based on second optical information within the image circle.

19. A non-transitory computer-readable storage medium storing a program for causing a computer to execute the image processing method according to claim 18.

* * * * *